United States Patent
Gamble (10) Patent No.: US 7,716,312 B2
(45) Date of Patent: May 11, 2010

(54) METHOD AND SYSTEM FOR TRANSFERRING LARGE DATA FILES OVER PARALLEL CONNECTIONS

(75) Inventor: Jonathan Bailey Gamble, San Francisco, CA (US)

(73) Assignee: Avid Technology, Inc., Tewksbury, MA (US)

( * ) Notice: Subject to any disclaimer, the term of this patent is extended or adjusted under 35 U.S.C. 154(b) by 1128 days.

(21) Appl. No.: 10/294,094

(22) Filed: Nov. 13, 2002

(65) Prior Publication Data

US 2004/0093420 A1 May 13, 2004

(51) Int. Cl.
G06F 15/173 (2006.01)

(52) U.S. Cl. .................. 709/223; 709/203; 709/224; 709/230

(58) Field of Classification Search .................. 709/230, 709/203, 217, 219, 231, 229, 223, 224
See application file for complete search history.

(56) References Cited

U.S. PATENT DOCUMENTS

| | | | |
|---|---|---|---|
| 5,379,374 | A | 1/1995 | Ishizaki et al. |
| 5,392,400 | A | 2/1995 | Berkowitz et al. |
| 5,420,974 | A | 5/1995 | Morris et al. |
| 5,617,539 | A | 4/1997 | Ludwig et al. |
| 5,644,714 | A | 7/1997 | Kikinis |
| 5,680,400 | A | 10/1997 | York |
| 5,680,609 | A | 10/1997 | Reinhardt |
| 5,727,155 | A | 3/1998 | Dawson |
| 5,784,561 | A | 7/1998 | Bruno et al. |
| 5,796,424 | A | 8/1998 | Ely et al. |
| 5,805,821 | A | 9/1998 | Saxena et al. |
| 5,811,706 | A | 9/1998 | Van Buskirk et al. |
| 5,841,977 | A | 11/1998 | Ishizaki et al. |
| 5,872,923 | A | 2/1999 | Schwartz et al. |
| 5,880,788 | A | 3/1999 | Bregler |

(Continued)

FOREIGN PATENT DOCUMENTS

EP 0933906 4/1999

(Continued)

OTHER PUBLICATIONS

Ishikura, Masami, et al., "Multi connection TCP mechanism for high performance transport In an ATM Network", Broadband Communications, Global Infrastructure for the Information Age. Proceedings of the IFIP-IEEE Conf. on Broadband Communications, Apr. 23, 1996, pp. 443-454.

(Continued)

*Primary Examiner*—Lashonda T Jacobs
(74) *Attorney, Agent, or Firm*—Oliver Strimpel (57) ABSTRACT

A method and system are disclosed for transferring large data files over parallel connections. A file can be transferred between a first application operating on a first system and a second application operating on a second system. A plurality of connections are established between the first application and the second application. A send buffer is created to store N segments of the file at the first system, N being an integer greater than one. The N segments of the file are read into the send buffer. Each segment in the buffer is sent on a corresponding connection among the plurality of connections for delivery to the second application. The number of connections can be selected by a user.

26 Claims, 7 Drawing Sheets

U.S. PATENT DOCUMENTS

| | | |
|---|---|---|
| 5,886,274 A | 3/1999 | Jungleib |
| 5,896,506 A | 4/1999 | Ali et al. |
| 5,912,697 A | 6/1999 | Hashimoto et al. |
| 5,926,205 A | 7/1999 | Krause et al. |
| 5,930,473 A | 7/1999 | Teng et al. |
| 5,937,162 A | 8/1999 | Funk et al. |
| 5,950,198 A | 9/1999 | Falls et al. |
| 5,952,599 A | 9/1999 | Dolby et al. |
| 5,995,491 A | 11/1999 | Richter et al. |
| 6,014,694 A | 1/2000 | Aharoni et al. |
| 6,044,205 A | 3/2000 | Reed et al. |
| 6,061,717 A | 5/2000 | Carleton et al. |
| 6,085,251 A | 7/2000 | Fabozzi, II |
| 6,101,507 A | 8/2000 | Cane et al. |
| 6,105,055 A | 8/2000 | Pizano et al. |
| 6,128,644 A | 10/2000 | Nozaki |
| 6,128,652 A | 10/2000 | Toh et al. |
| 6,154,600 A | 11/2000 | Newman et al. |
| 6,166,735 A | 12/2000 | Dom et al. |
| 6,173,377 B1 | 1/2001 | Yanai et al. |
| 6,209,021 B1 | 3/2001 | Ahimovic et al. |
| 6,212,549 B1 | 4/2001 | Page et al. |
| 6,230,173 B1 | 5/2001 | Ferrel et al. |
| 6,233,600 B1 | 5/2001 | Salas et al. |
| 6,237,025 B1 | 5/2001 | Ludwig et al. |
| 6,243,676 B1 | 6/2001 | Witteman |
| 6,263,507 B1 | 7/2001 | Ahmad et al. |
| 6,266,691 B1 | 7/2001 | Watanabe et al. |
| 6,269,080 B1 | 7/2001 | Kumar |
| 6,269,394 B1 | 7/2001 | Kenner et al. |
| 6,275,937 B1 | 8/2001 | Hailpern et al. |
| 6,288,739 B1 | 9/2001 | Hales et al. |
| 6,295,058 B1 | 9/2001 | Hsu et al. |
| 6,308,204 B1 | 10/2001 | Nathan et al. |
| 6,310,941 B1 | 10/2001 | Crutcher et al. |
| 6,314,454 B1 | 11/2001 | Wang et al. |
| 6,317,777 B1 | 11/2001 | Skarbo et al. |
| 6,320,600 B1 | 11/2001 | Smith et al. |
| 6,321,252 B1 | 11/2001 | Bhola et al. |
| 6,324,544 B1 | 11/2001 | Alam et al. |
| 6,332,153 B1 | 12/2001 | Cohen |
| 6,338,086 B1 | 1/2002 | Curtis et al. |
| 6,343,313 B1 | 1/2002 | Salesky et al. |
| 6,351,467 B1 | 2/2002 | Dillon |
| 6,351,471 B1 | 2/2002 | Robinett et al. |
| 6,356,903 B1 | 3/2002 | Baxter et al. |
| 6,373,926 B1 | 4/2002 | Foladare et al. |
| 6,397,230 B1 | 5/2002 | Carmel et al. |
| 6,405,256 B1 * | 6/2002 | Lin et al. ............... 709/231 |
| 6,421,685 B1 | 7/2002 | Nishikawa |
| 6,430,567 B2 | 8/2002 | Burridge |
| 6,438,611 B1 | 8/2002 | Hara et al. |
| 6,442,604 B2 | 8/2002 | Romine |
| 6,446,130 B1 | 9/2002 | Grapes |
| 6,453,355 B1 | 9/2002 | Jones et al. |
| 6,470,329 B1 | 10/2002 | Livschitz |
| 6,507,845 B1 | 1/2003 | Cohen et al. |
| 6,513,061 B1 | 1/2003 | Ebata et al. |
| 6,546,488 B2 | 4/2003 | Dillon et al. |
| 6,549,934 B1 * | 4/2003 | Peterson et al. ............ 709/203 |
| 6,567,844 B2 | 5/2003 | Fukasawa |
| 6,574,742 B1 | 6/2003 | Jamroga et al. |
| 6,598,074 B1 | 7/2003 | Moller et al. |
| 6,604,144 B1 | 8/2003 | Anders |
| 6,646,655 B1 | 11/2003 | Brandt et al. |
| 6,665,835 B1 | 12/2003 | Gutfreund et al. |
| 6,687,801 B1 | 2/2004 | Kamvysselis |
| 6,728,886 B1 | 4/2004 | Ji et al. |
| 6,760,756 B1 | 7/2004 | Davis et al. |
| 6,782,412 B2 | 8/2004 | Brophy et al. |
| 6,823,394 B2 * | 11/2004 | Waldvogel et al. .......... 709/231 |
| 6,912,591 B2 | 6/2005 | Lash |
| 6,937,581 B1 * | 8/2005 | Berger et al. ................ 370/328 |
| 7,069,296 B2 | 6/2006 | Moller et al. |
| 7,286,476 B2 * | 10/2007 | Helmy et al. ............ 370/230.1 |
| 7,526,557 B2 * | 4/2009 | Bowler ....................... 709/227 |
| 7,552,192 B2 * | 6/2009 | Carmichael ................. 709/217 |
| 7,617,349 B2 * | 11/2009 | Kalos et al. ................. 710/316 |
| 7,668,901 B2 * | 2/2010 | Franke et al. ............... 709/203 |
| 2001/0011308 A1 | 8/2001 | Clark et al. |
| 2002/0184252 A1 | 12/2002 | Holtz et al. |
| 2002/0194205 A1 | 12/2002 | Brown et al. |
| 2002/0194442 A1 | 12/2002 | Yanai et al. |
| 2003/0120685 A1 | 6/2003 | Duncombe et al. |
| 2003/0140050 A1 | 7/2003 | Li et al. |
| 2003/0195924 A1 | 10/2003 | Franke et al. |
| 2003/0195929 A1 | 10/2003 | Franke et al. |
| 2004/0015456 A1 | 1/2004 | Holtz et al. |
| 2004/0068523 A1 | 4/2004 | Keith et al. |
| 2004/0240842 A1 * | 12/2004 | Mahdavi ...................... 386/46 |
| 2005/0044250 A1 * | 2/2005 | Gay et al. ................... 709/230 |
| 2005/0234961 A1 | 10/2005 | Edvalson et al. |

FOREIGN PATENT DOCUMENTS

| | | |
|---|---|---|
| WO | WO 94/11858 | 5/1994 |
| WO | WO 01/22398 | 3/2001 |
| WO | WO 02/075539 | 9/2002 |
| WO | WO 02/077862 | 10/2002 |

OTHER PUBLICATIONS

Ishikura et al., "Multi connection TCP mechanism for high performance transport in an ATM Network," *Broadband Communications. Global infrastructure for the information age. Proceedings of the international IFIP-EEE conference on broadband communications,* Canada, 1996, London, Chapman and Hall, GB, pp. 443-454, Apr. 23, 1996.

Balasubramaniam, S., et al. "What is a File Synchronizer", Mobicom '98 Proceedings of the 4th Annual ACM/IEEE International Conference on Mobile Computing and Networking, Dallas, TX, Oct. 25-30, 1998, annual ACM/IEEE International Conference on Mobile Computing and Networking, New York, NY, Oct. 25, 1998, pp. 98-108.

Berra, P. Bruce et al., "Data and Knowledge Management in Multimedia Systems", IEEE Transaction Knowledge and Data Engineering, vol. 10, No. 6, Nov./Dec. 1998.

Berra, P.B., et al., "Issues in Networking and Data Management of Distributed Multimedia Systems", IEEE, 1992.

Christoffel, J., "Bal-A Tool To Synchronize Document Collections Between Computers", Proceedings of the Eleventh Systems Administration Conf. (LISA XI) Usenix Association, Berkeley, California, Oct. 1997, pp. 85-88.

Moeller E., et al., "Distributed Processing Of Multimedia Information", IEEE Computer Society Proceedings, May 28-Jun. 1, 1990.

Paul R., et al., "Issues in Database Management of Multimedia Information", IEEE 1994.

Ramsey, Norman et al., "An Alegebraic Approach to File Synchronization", Software Engineering Notes, ACM USA, vol. 26, No. 5, Sep. 2001, pp. 175-185.

Selected web pages from "Blue Mountain Greeting Cards", www.bluemountain.com, Dec. 10, 1997.

Selected web pages from Egreetings, www.egreetings.com, Dec. 21, 1996.

Selected web pages from "MessageMates", www.messagemates.com, Jan. 25, 1999.

Selected web pages from "Quark Digital Media Systems", www.quark.com., Oct. 9, 2001.

* cited by examiner

METHOD AND SYSTEM FOR TRANSFERRING LARGE DATA FILES OVER PARALLEL CONNECTIONS

FIELD

This invention relates generally to data processing systems, and, more particularly, to a method and system for transferring large data files over parallel connections.

BACKGROUND

With the emergence of the Internet, large amounts of information can be shared and distributed between any number of interconnected users. The users can be remotely located, spanning multiple continents. Typically, the users store information in data files ("files"). Many user applications such as multimedia applications running on computing systems distribute large files (e.g., multimedia files), which can exceed one gigabyte in memory space. Distributing large files between user applications over a network such as the Internet can be problematic.

For instance, many Internet applications use the Transfer Control Protocol/Internet Protocol (TCP/IP) layers to send files separated as packets over the Internet. The IP layer handles the actual delivery of the packets and the TCP layer ensures that each packet is delivered and reordered correctly for its destination application. To deliver packets, TCP establishes a connection between two TCP endpoints, defined by an IP address and a port number. An IP address identifies a computing system and the port number identifies an application operating within that computing system. Each packet contains a sequence number. The sequence numbers are used to acknowledge received packets and to reorder correctly packets at a receiving end in the case of packets being received out of order.

To ensure reliable delivery of packets, TCP must receive acknowledgement that delivered packets were received at a receiving end. In this process, TCP uses a "sliding window" algorithm to dynamically calculate the maximum number of unacknowledged (in-transit) packets to allow before enacting flow control (preventing further sends). The sliding window algorithm is designed to prevent congestion while still allowing the window to grow large enough to accommodate fast link speeds. Unfortunately, the algorithm often treats latency induced by sending packets large distances and latency induced by actual congestion similarly as it is programmatically difficult to make a distinction between the two at the level on which TCP operates.

In particular, If a TCP connection experiences high latency, TCP assumes congestion in which case TCP decreases the size of the "window." Furthermore, TCP may also resend the packets if not acknowledged within a certain period of time. However, in many instances, the TCP connection is over a high speed connection line, but the receiving end is at a remote location, which can cause an inherent latency in the delivery and acknowledgement of packets. For example, an 8 mbps connection line used for sending packets to a remote user will experience latency at the receiving end that causes the overall throughput to be a small fraction of the maximum possible due to the congestion control mechanism of TCP. As such, applications may not be able to utilize the full available bandwidth on a connection line when sending large files.

Another limitation with delivering large files over high-speed connections is that the network throughput can exceed the file input/output (I/O) capabilities in the sending and receiving computing systems. For instance, multiple memory devices may be required to store and buffer a large file. If multiple memory devices are required to store or buffer a large file, to seek the appropriate segments of the file or location of the segment in memory can be time consuming. Such file I/O processes can thus limit the throughput on a high speed connection line. Therefore, delivering large files at the maximum possible speed requires efficient file I/O processes.

There exists, therefore, a need for an improved method and system that overcome the limitations of transferring data files.

SUMMARY

According to one aspect of the invention, a method is disclosed for transferring a file between a first application operating on a first system and a second application operating on a second system. A plurality of connections are established between the first application and the second application. A send buffer is created to store N sequential segments of the file at the first system, wherein N is an integer greater than one. The N segments of the file are stored into the send buffer. Each segment in the send buffer is sent on a corresponding connection among the plurality of connections for delivery to the second application.

According to another aspect of the invention, a computing system is that includes first and second systems operating first and second applications, respectively, wherein a plurality of connections are established between the first and second applications. The computing system also includes a server coupled to the first and second systems on the plurality of connections. The server receives segments of a file from the first system on each of the connections, stores the segments in a streaming file for each connection, and streams the segments to the second system for each connection.

Other features and advantages will be apparent from the accompanying drawings, and from the detailed description, which follows below.

BRIEF DESCRIPTION OF THE DRAWINGS

The accompanying drawings, which are incorporated in and constitute a part of this specification, illustrate exemplary embodiments implementations and, together with the detailed description, serve to explain the principles of the invention. In the drawings.

DETAILED DESCRIPTION

Reference will now be made in detail to embodiments and implementations, examples of which are illustrated in the

A. Overview

The disclosed techniques provide an efficient manner of transferring data files ("files"), especially large files. In one implementation, a file can be transferred between a first application operating on a first system and a second application operating on a second system. A plurality of connections are established between the first application and the second application. A send buffer is created to store N segments of the file at the first system, wherein N is an integer greater than one. The N segments of the file are read into the send buffer. Each segment in the send buffer is sent on a corresponding connection among the plurality of connections for delivery to the second application. The number of connections can be selected by a user.

Thus, by using parallel connections between applications, the maximum throughput increases N times per connection over a connection line. This allows applications to utilize the full available bandwidth on a connection line, especially a high speed connection line, when sending data. As a result, throughput on the connection line can be optimized. Additionally, by segmenting a file and using a corresponding connection for each segment stored in a buffer, file I/O processes can be performed more efficiently. Such a process also allows files to be efficiently reconstructed at a receiving end. As detailed below, the following embodiments and implementations overcome inefficiencies in transferring large amounts of data (e.g., large files) between applications on a network such as the Internet.

B. Exemplary Network and Computing System

Figure 1:
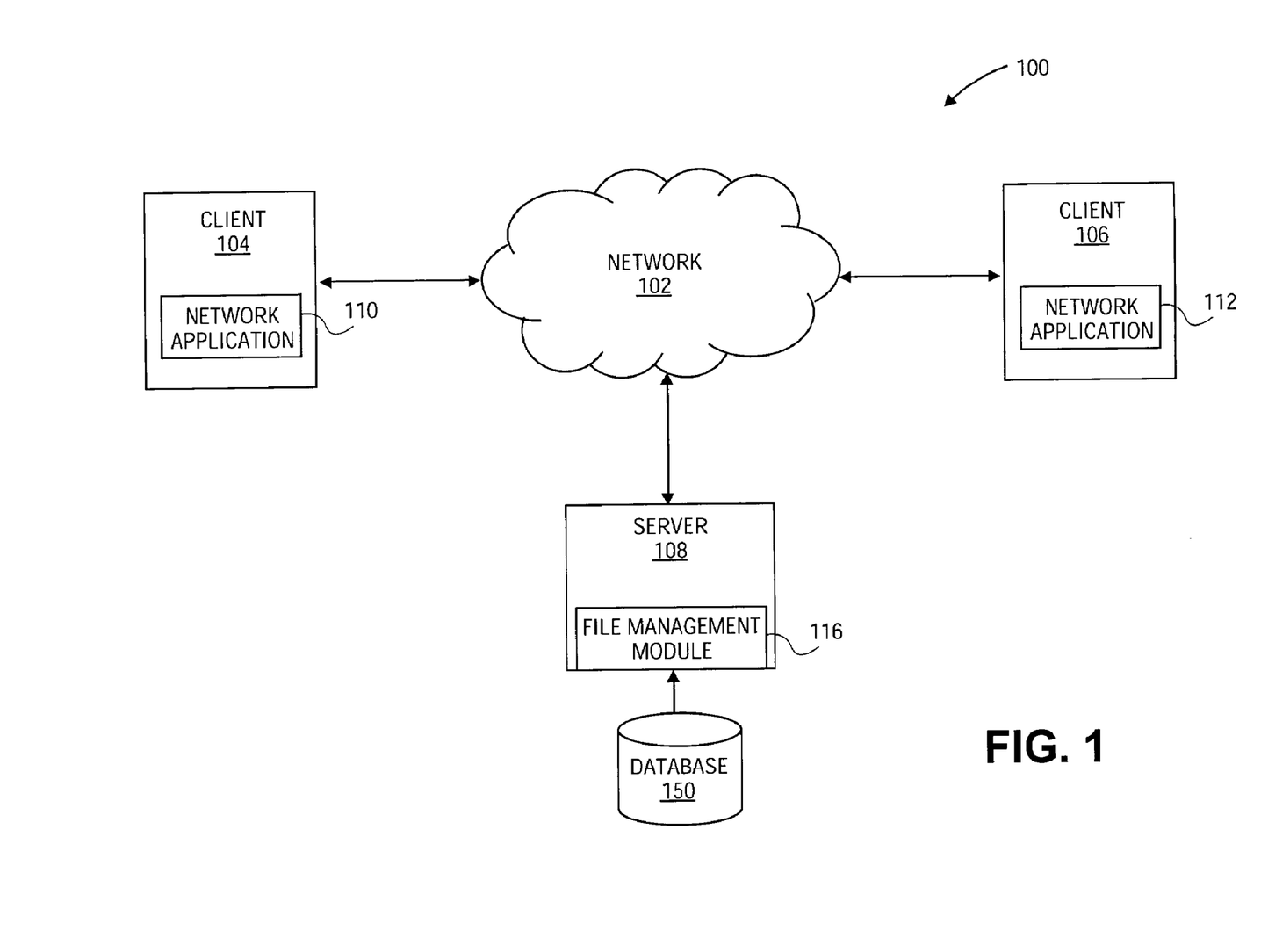
FIG. 1 illustrates an exemplary network and computing system environment for practicing the invention.

FIG. 1 illustrates an exemplary network environment 100 for practicing the invention. Network environment 100 includes clients 104 and 106 connected to a server 108 via a network 102. Server 108 is connected to a database 150. Database 150 can store data files consistent with the techniques disclosed herein. In one example, database 150 is a database system including one or more storage devices. Database 150 may store other types of information such as, for example, configuration or storage use information. Network 102 may represent one or more networks including a local area network (LAN), or a wide area network (WAN) such as the Internet. Network environment 100 is suitable for network applications operating with standard file transfer protocols such a FTP or other like protocols. Other protocols that can be used in network environment 100 include file system protocols such as SMB for Microsoft NT® file systems, AFP for the Apple® Filer Protocol, or NFS for Unix based systems.

Clients 104 and 106 are computing devices or systems such as personal computers or workstations. Clients 104 and 106 include network applications 110 and 112, respectively. Network applications 110 and 112 can provide interfaces such as, for example, a web browser to access and send data between applications over network 102. Examples of network applications 110 and 112 can include collaboration applications such as the Rocket Delivery System by Rocket Networks, Inc. Such applications can be configured to transfer data or files using the file transfer techniques described below. These techniques allow network applications 110 and 112 to establish multiple or parallel ("parallel") connections between each other for sending data or files. In one embodiment, the parallel connections are multiple virtual connections established between network applications 104 and 106. Additionally, parallel connections can be established between server 108 and clients 104 and 106.

Server 108 is a computing device such as, for example, a personal computer, workstation, mini-mainframe, or mainframe computer. In the example of FIG. 1, server 108 provides store and forward functions for network applications 110 and 112 on clients 104 and 106, respectively. For example, in sending a file from client 104 to client 106, using the techniques disclosed herein, client 104 sends data for each file to server 108, which stores the data and then forwards the data to client 106. Thus, server 108 includes a file management module 116 ("module 116") to handle the store and forward functions. Module 116 can also manage data or files and/or updates or changes to the data or files for network applications 110 and 112. Module 116 can be software and/or hardware to implement techniques disclosed herein. Module 116 can also have multiple or parallel connections established between network applications 110 and 112.

The manner of transferring data or files between network applications 110 and 112 operating on clients 104 and 106, respectively, over parallel connections will be described in further detail below. Furthermore, the manner of file management module 116 to handle store and forward functions for network applications 110 and 112 over parallel connections will also be described below.

Figure 2:
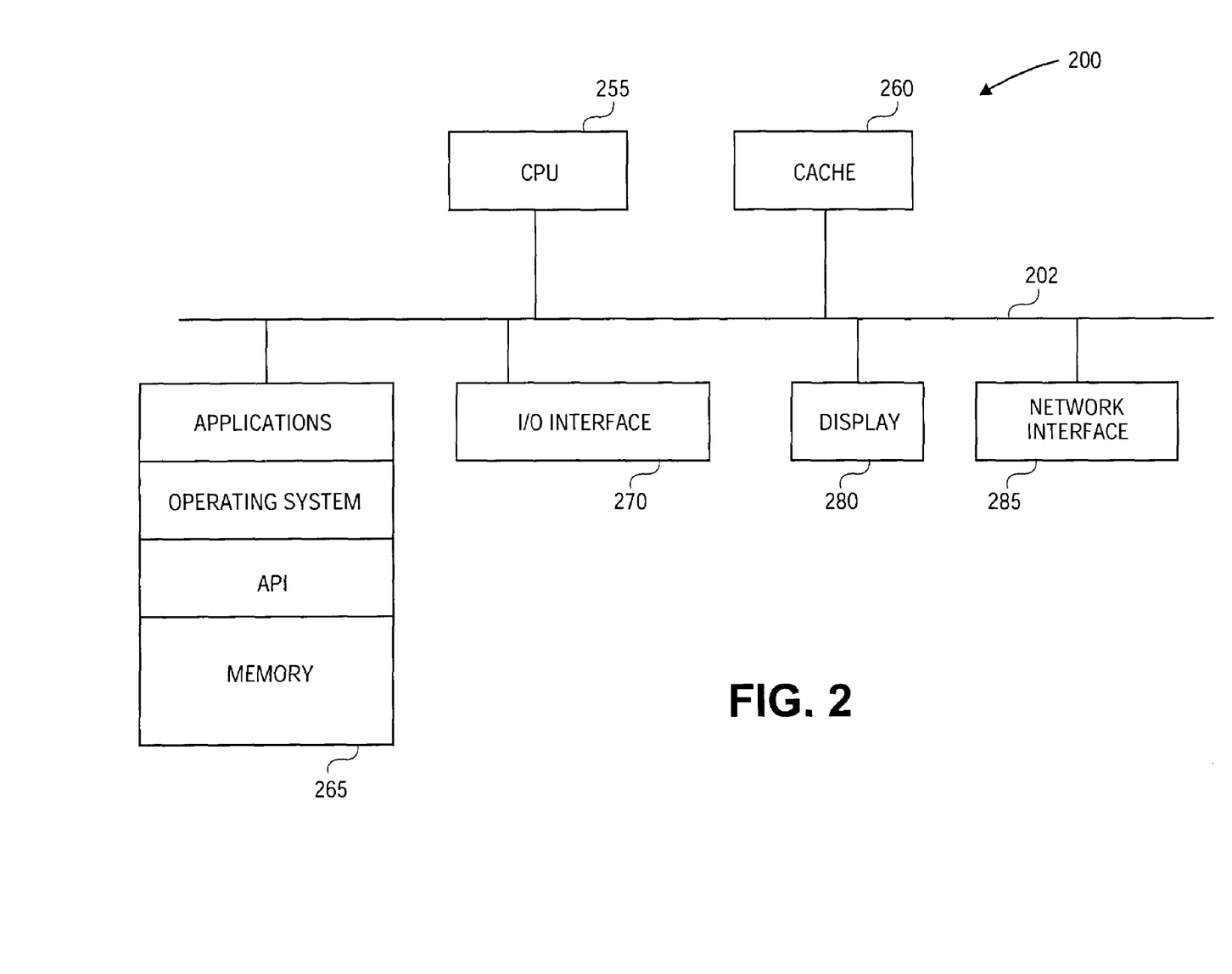
FIG. 2 illustrates an exemplary block diagram of internal components of a computing system.

FIG. 2 illustrates an exemplary block diagram of internal components of a computing system 200. These components may represent the internal components of clients 104 and 106 or server 108 shown in FIG. 1, and can be used to perform the file transfer techniques described in FIGS. 4-6.

Computing system 200 includes several components all interconnected via a system bus 202. System bus 202 can be bi-directional system bus having thirty-two data and address lines for accessing a memory 265 and a cache memory 260 for transferring and storing data or files for computing system 200 or from other computing systems. Alternatively, multiplexed data/address lines may be used instead of separate data and address lines.

Examples of memory 265 or cache memory 260 include a random access memory (RAM), read-only memory (ROM), video memory, flash memory, or other appropriate memory devices. Additional memory devices (not shown) may be included in computing system 200 such as, for example, fixed and removable media (including magnetic, optical, or magnetic optical storage media). These types of media may also operate as a cache memory.

Computing system 200 may communicate with other computing systems (e.g., server 108 or clients 104 and 106) via a network interface 285. Examples of network interface 285 include Ethernet, telephone, or broadband connection interfaces. Computing system 200 includes a central processing unit (CPU) 255, examples of which include the Pentium® family of microprocessors manufactured by Intel® Corporation. However, any other suitable microprocessor, micro-, mini-, or mainframe type processor may be used as the CPU for the computing system 200. CPU 255 provides the support for storing and transferring files to carry out the file transfer techniques described herein.

Memory 265 may store instructions or code for implementing programs, applications, or modules (e.g., network applications 110 and 112 and file management module 116) and an application programming interface (API) to one or more other programs or operating systems. For example, CPU 355 may execute instructions for network applications 110 and 112 or file management module 116 to perform the file transfer techniques disclosed herein. Memory 265 also stores an operating system, examples of which can include the Microsoft® family of operating systems, Linux operating system, or other appropriate operating systems that provide networking capabilities.

Cache memory 260 may store data or files for sending and receiving to and from other computing systems. Computing system 200 may also receive input data or instructions from any number of input/output (I/O) devices via I/O interface 270. Examples of I/O devices may include a keyboard, pointing device, or other appropriate input devices. The I/O devices may also include external storage devices or computing systems or subsystems. Computing device 200 may also present information data or information via, e.g., a browser, on a display 280.

Figure 3:
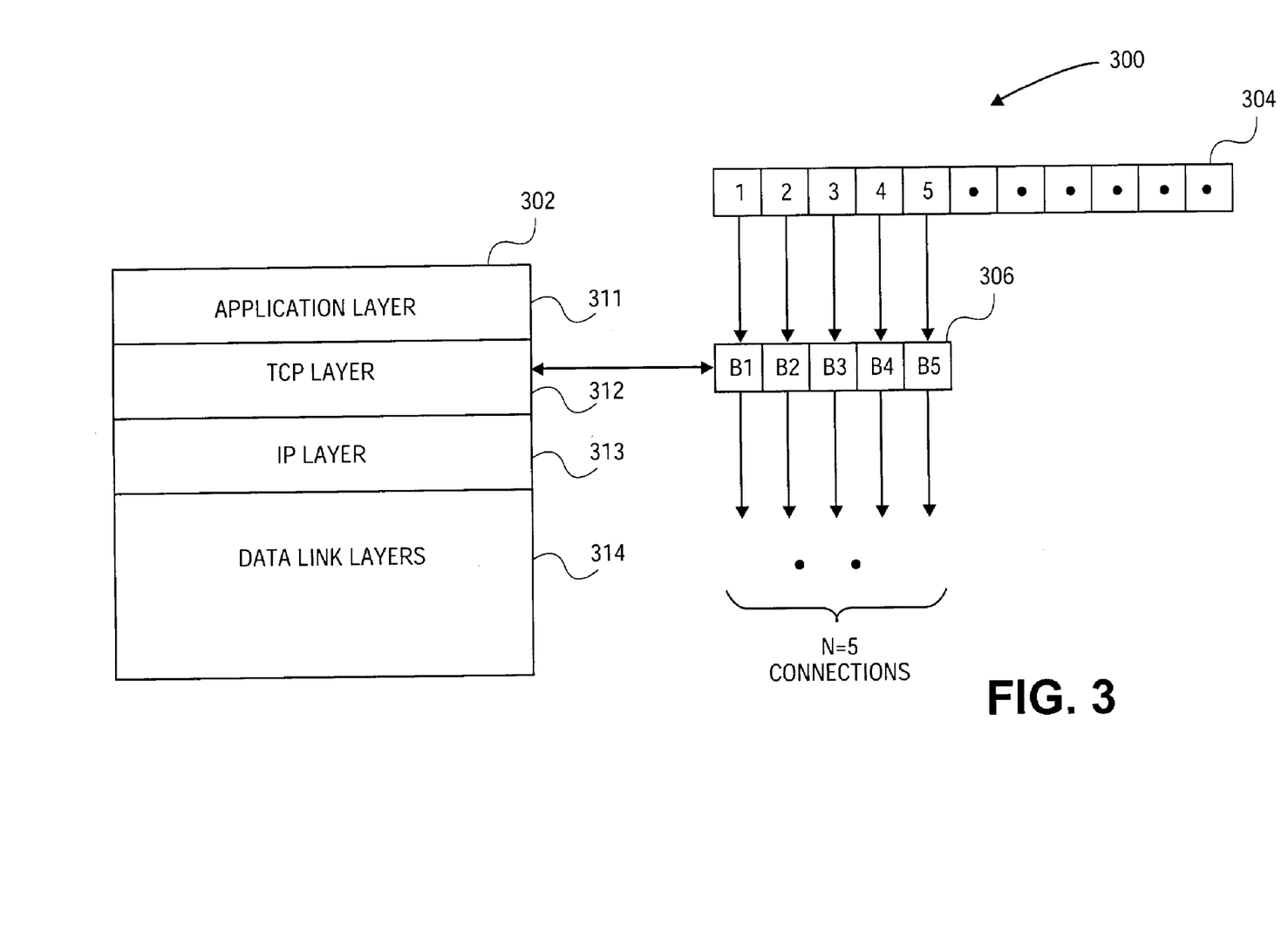
FIG. 3 illustrates an exemplary application and protocol layers within a computing system using parallel connections and buffers.

FIG. 3 illustrates an exemplary application and service model 302 ("model 302") using parallel connections and buffers for clients 104 and 106 or server 108 in FIG. 1. The example model 302 is for applications operating on the Internet using TCP/IP protocol layers. Nevertheless, model 302 can be implemented for an open standard interface (OSI) model for different types of networks and protocols that allow for parallel connections between applications.

Referring to FIG. 3, model 302 includes applications layer 311, TCP layer 312, IP layer 313, and data link layers 314. The TCP layer 312, IP layer 313, and data link layers 314 provide services for applications layer 311. Applications layer 311 includes applications operating on clients 104 and 106 and server 108. Thus, applications layer 311 can refer to network applications 110 and 112 and file management module 116.

TCP layer 312 segments data for application layer into packets for delivery to a destination application on a computing system. TCP layer 312 also receives packets from a sending application and delivers data from the packets to application layer 311. TCP layer 312 also provides reliable packet transfer services by performing error-checking and ensuring all packets have been received by the destination application, which can include using the "sliding window" algorithm. For example, TCP layer 312 operating on client 104 will ensure that packets for delivery to network application 112 operating on client 106 are received by network application 112 or client 106.

TCP layer 312 uses sequence numbers for acknowledging and reordering the packets. As such, TCP layer 312 operating on client 106 can send acknowledgements of the packets. As described below, TCP layer 312 can send a set number of packets or window per connection on multiple or parallel connections to a destination application. IP layer 313 provides routing and forwarding functions so that a packet can reach its destination using an optimal path. This layer can use any number of routing tables to determine the nodes to send packets. Each packet can have an IP address for a destination computing system. Data link layers 314 provide services handling the actual transfer of the packets on a physical connection. The physical connection can be a wired or wireless connections using standard data link communication protocols.

In the example of FIG. 3, a plurality of connections or parallel connections can be established between applications at TCP layer 312. This example shows N=5, wherein N can be an integer greater than one. TCP layer 312 establishes parallel TCP connections from client applications and/or to server applications. For example, file management module 116 operating on server 108 can listen for TCP connection requests on its well-known IP address and single well-known port number.

Moreover, to establish N parallel connections, a client application (e.g., network application 110) selects N discrete unused port numbers on the client system. These client port numbers must be unique within the space of valid and unused port numbers on the client system. The actual values of the port numbers can be random. The client system can then initiate the standard TCP connection sequence for each of the N parallel connections. The server application, e.g., file management module 116, can accept these connection requests and process all N per-connection data transfers independently and concurrently.

The TCP layer 312 can operate with a plurality of TCP buffers 306. TCP buffers 306 includes a number of sub-buffers equal to N. As shown, TCP buffers 306 includes B1 through B5 sub-buffers. The number of sub-buffers and N can be configured or adjusted by a user. As detailed below, a file 304 can be segmented into a set number of bytes (e.g., "READCHUNK"). As shown, each segment 1 through 5 is stored in a corresponding sub-buffer B1 through B5. Each of these segments 1 through 5 and sub-buffers B1 through B5 have a corresponding connection. The data in sub-buffers B1 through B5 are sent on the corresponding connections to a destination computing system, which can include client 106 and/or server 108. The process of sending or transferring data of files is detailed below regarding the methods of FIGS. 4-6.

C. File Transfer Techniques

Figure 4:
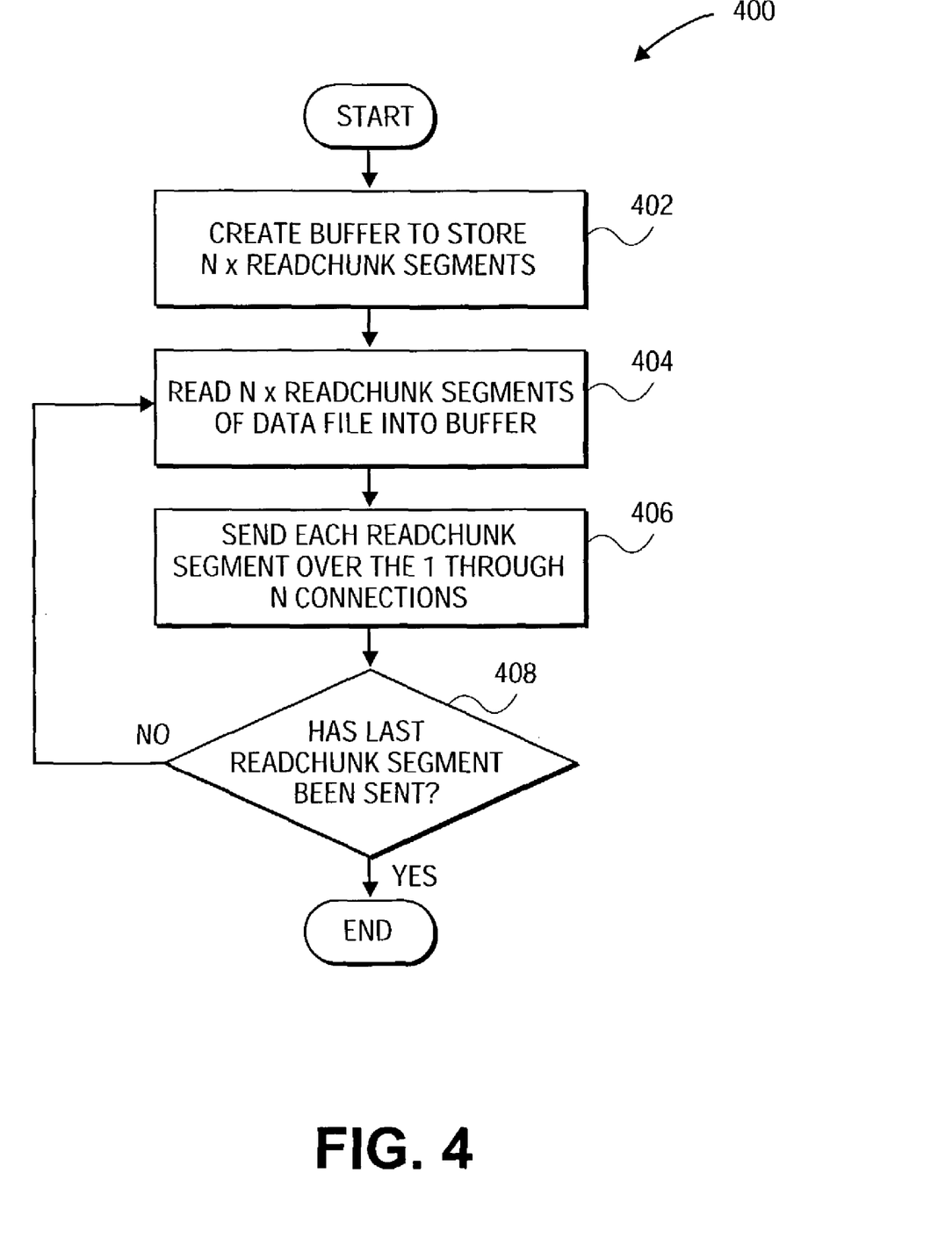
FIG. 4 illustrates a flow diagram of a method for sending data over parallel connections at a sending system.
Figure 5:
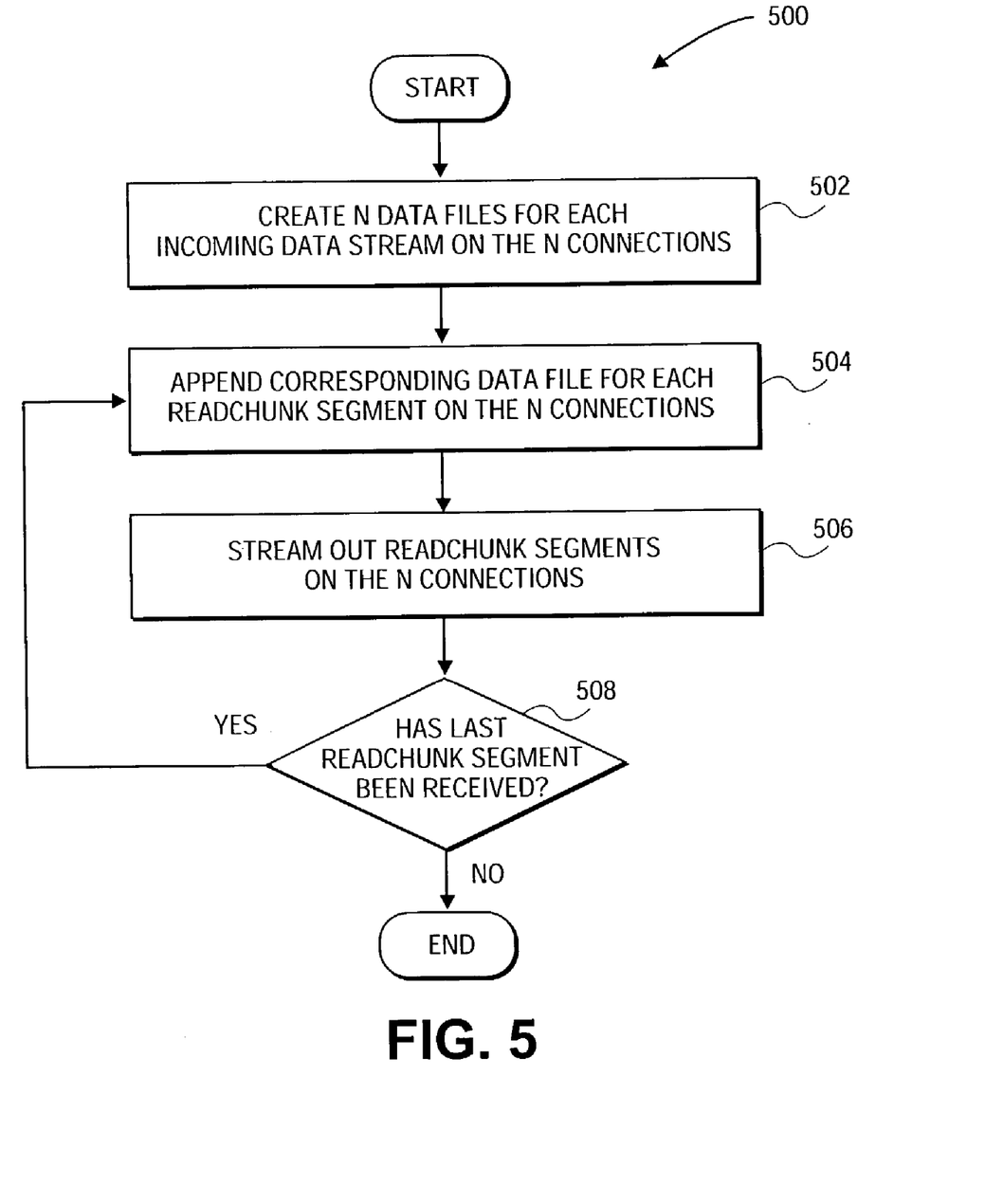
FIG. 5 illustrates a flow diagram of a method for receiving and forwarding data over parallel connections at a server.
Figure 6:
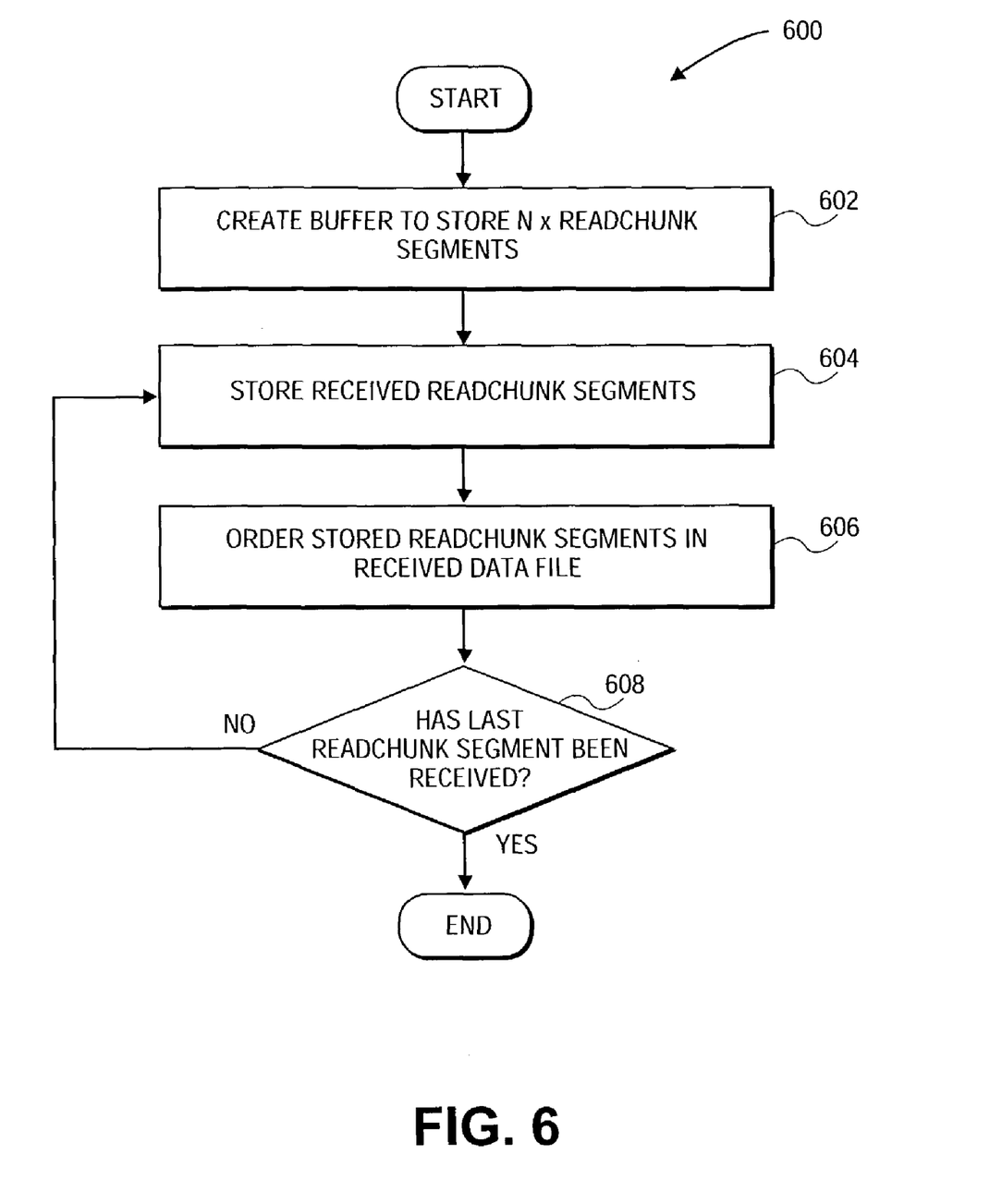
FIG. 6 illustrates a flow diagram of a method for receiving data from the server over parallel connections at a receiving system.

The following methods of FIGS. 4-6 illustrate file transfer techniques over parallel connections between applications such as network applications 110 and 112. For purposes of explanation, with reference to diagram 700 of FIG. 7, the following methods are described for transferring a data file 702A at client 104 to client 106 via server 108 over parallel connections. Conversely, a data file can be sent in the opposite direction from client 106 to client 104 via server 108. In this manner, each client 104 and client 106 can include both a send and receive buffer.

Figure 7:
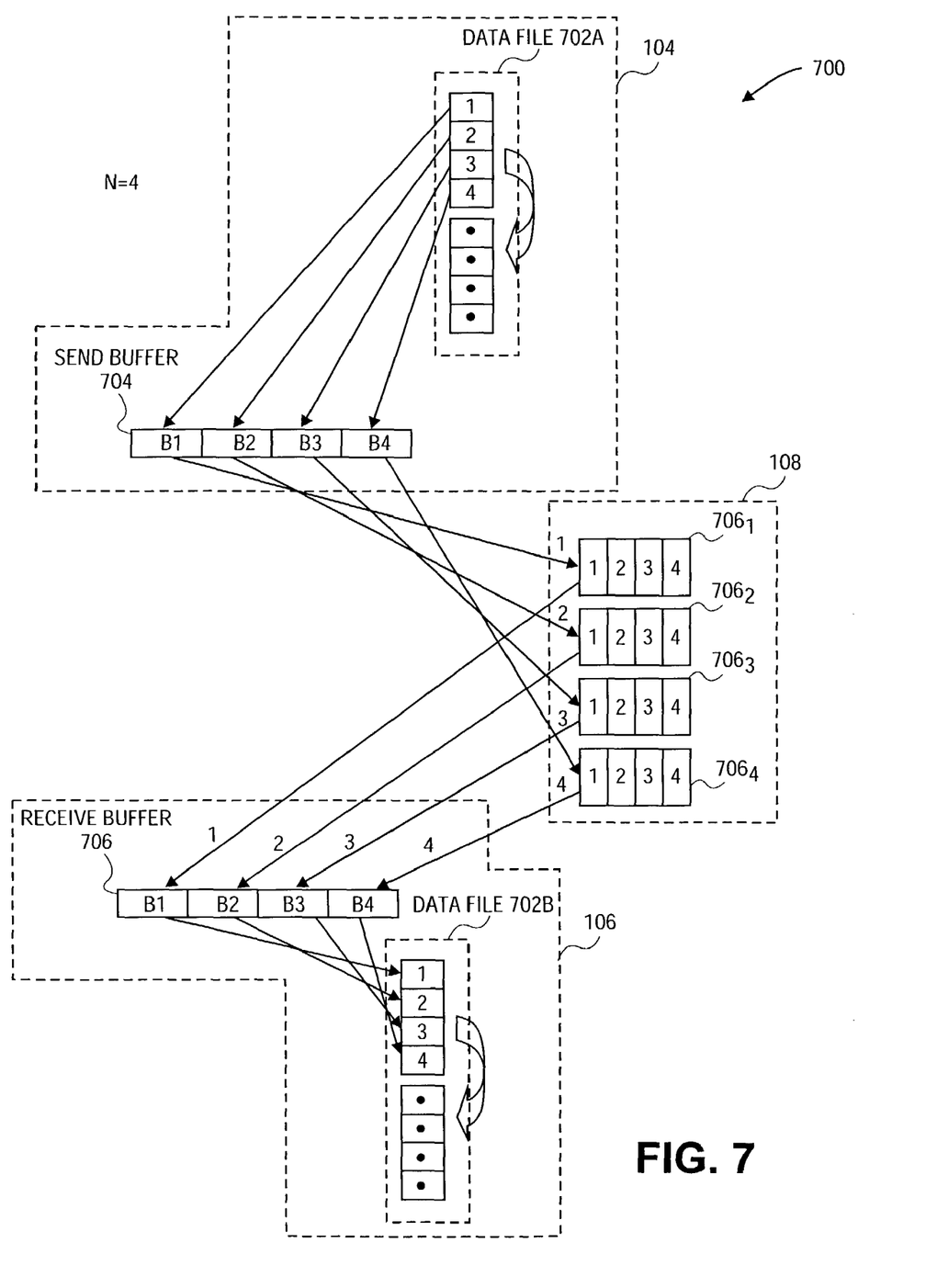
FIG. 7 illustrates an exemplary diagram of the data flow over parallel connections between the sending system, server, and receiving system.

Additionally, these examples are described with N=4 connections having been established between network applications 110 and 112 operating on clients 104 and 106 and with file management module 116 operating on server 108. Nevertheless, the following methods can be implemented with N number of connections where N is greater than one. The connections can include transfer control protocol (TCP) connections described above.

FIG. 4 illustrates a flow diagram of a method 400 for sending data over N=4 parallel connections at client 104 (sending system). This method can be performed by network application 110 operating on client 104.

Initially, a send buffer 704 is created to store N×READCHUNK of a data file 702A (step 402). In one example, send buffer 704 can be a 1 MB buffer storing N=4 256K segments of data file 702A. Send buffer 704 includes four sub-sections B1 through B4 to store N=4 READCHUNK segments of data file 702A. N×READCHUNK segments of data file 702A are read or stored into send buffer 704 (step 404). Each stored READCHUNK segment in sub-buffers B1 through B4 is sent on one of the N=4 parallel connections to server 108 (step 404). In this step, for each connection, READCHUNK segments in sub-buffers B1 through B4 can be read and sent independently of the other connections. For example, for connection 1, READCHUNK segment 1 of data file 702A would be stored in sub-buffer B1 of send buffer 704 and READCHUNK segment 1 would be sent to server 108 on connection 1. The process of storing and forwarding each READCHUNK segment of data file 702A from client 104 by server 108 is described in FIG. 5.

A check is then made to determine if the last READCHUNK segment of data file 702A has been sent. If it has not, method 400 continues back to step 404 to continue reading and sending READCHUNK segments of data file 702A to server 108. If the last READCHUNK segment has been sent, method 400 ends. This process can be performed while methods 500 and 600 are being performed by server 108 and client 108. Furthermore, while each READCHUNK segment of data file 702A is being sent on a respective connection, standard TCP congestion protocols can be implemented on a per connection basis.

FIG. 5 illustrates a flow diagram of a method 500 for receiving and forwarding READCHUNK segments of data file 702A over the N=4 connections. This method can be performed by file management module 112 at server 108.

Initially, server 108 allocates memory to create N=4 stream files $706_1$ through $706_4$. That is, if there are N connections server 108 will create N stream files. Each of these stream files stores incoming READCHUNK segments from a corresponding connection. Alternatively, stream buffers, e.g., FIFO buffers, can be created or used to store incoming READCHUNK segments. For example, stream file $706_1$ stores READCHUNK segments stored in B1 sub-buffer of send buffer 704. For each READCHUNK segment received on a connection, the READCHUNK segment is appended to the appropriate stream file (step 504). For example, stream file $706_1$ will append the second READCHUNK segment received on connection 1 after the first READCHUNK segment has been stored in stream file $706_1$.

Next, the READCHUNK segments stored in the stream files $706_1$ through $706_4$ can be "streamed out," i.e., transmitted, to client 106 (step 506). In this step, for each connection, the streaming of READCHUNK segments can be performed independently. For example, stream buffer $706_1$ can stream out READCHUNK segments before stream buffer $706_2$. A check is then made to determine if the last READCHUNK segment of data file 702A has been streamed out. If has not, method 500 continues to step 504 and continues appending and streaming out READCHUNK segments from streaming files $706_1$ through $706_4$. If the last READCHUNK segment of data file 702A has been streamed out, method 500 ends. This process can be performed while methods 400 and 600 are being performed by clients 104 and 106, respectively.

FIG. 6 illustrates a flow diagram of a method 600 for receiving data from server 108 over N=4 parallel connections at client 106 (receiving system). This method can be performed by network application 112 operating on client 106.

Initially, a receive buffer 706 is created to store N=4 READCHUNK segments from stream files $706_1$ through $706_4$, respectively, from server 108 on client 106 (step 602). Receive buffer 706 can be configured in the same manner is send buffer 704. Receive buffer 706 includes four sub-buffers B1 through B4 to store N=4 READCHUNK segments of data file 702A that are streamed out of stream files $706_1$ through $706_4$, respectively. Received READCHUNK segments from server 108 are store in respective sub-buffers B1 through B4 based on the received connection (step 604). For example, READCHUNK segment 1 in stream file $706_1$ received on connection 1 is stored in sub-buffer B1 in receive buffer 706.

Next, the READCHUNK segments in receive buffer 706 are ordered into data file 702B to match the order in data file 702A (step 606). In this step, data file 702B can be persisted in one or more memory devices. A check is then made to determine if the last READCHUNK segment of data file has been received. If it has not, method 600 continues back to step 604 to continue receiving and ordering READCHUNK segments from server 108. If the last READCHUNK segment has been received and ordered in data file 702B, method 600 ends. This process can be performed while methods 400 and 500 are being performed by client 104 and server 108. Furthermore, while each READCHUNK segment is being received at client 106, standard TCP congestion protocols can be implemented on a per connection basis for client 106.

Thus, a method and system for transferring large data files over parallel connections have been described. Furthermore, while there has been illustrated and described what are at present considered to be exemplary embodiments, implementations, and methods of the present invention, various changes and modifications can be made, and equivalents can be substituted for elements thereof, without departing from the true scope of the invention. In particular, modifications can be made to adapt a particular element, technique, or implementation to the teachings of the present invention without departing from the spirit of the invention.

In addition, the described embodiments and implementations comprise computing systems, which can run software to implement the methods, steps, operations, or processes described herein. Other embodiments of the invention will be apparent from consideration of the specification and practice of the invention disclosed herein. Therefore, it is intended that the specification and examples be considered as exemplary only, with a true scope and spirit of the invention being indicated by the following claims.

What is claimed is:

1. A method for transferring a file between a first application operating on a first computer and a second application operating on a second computer, wherein the second computer and the first computer are interconnected by a computer network, the method comprising:
   establishing a plurality of parallel, logical connections in the computer network between the first application and the second application by the first computer:
     selecting, by the first application, a number N of unused port numbers on the first computer, where N is an integer greater than one;
     initiating a connection sequence with the second application for each of the selected port numbers;
     creating a send buffer having N sub-buffers to store N segments of the file a the first computer;
     storing N segments of the file into the sub-buffers of the send buffer;
     sending each segment in the send buffer on a corresponding connection among the plurality of parallel, logical connections for delivery to the second application; and
     repeating the storing and sending of segments of the file until the file is sent.

2. The method of claim 1, wherein sending each segment includes sending each segment on each connection independently of the other connections.

3. The method of claim 1, wherein the plurality of parallel, logical connections comprises N connections, the method further comprising:
   creating N streaming files for the N connections at a server;
   appending each segment on the N connections received from the first computer to a corresponding streaming file for the N connections; and
   streaming the segments in the N streaming files to the second computer on the N connections.

4. The method of claim 3, wherein streaming the segments includes streaming the segments on each connection independently of the other connections.

5. The method of claim 3, further comprising:
   creating a receive buffer to store N segments of the file at the second computer;

storing streamed segments from the server in the receive buffer for each connection; and ordering the segments in the buffer for delivery to the second application.

6. The method of claim 5, wherein storing streamed segments includes storing the streamed segments for each connection independently of the other connections.

7. The method of claim 1, wherein establishing the plurality of parallel, logical connections includes establishing a plurality of parallel transfer control protocol (TCP) connections.

8. A computing system comprising:

first and second computers operating first and second applications, respectively, and connected by a plurality of parallel, logical connections established between the first and second applications wherein each connection uses a port number selected from a number N of unused port numbers on the first computer, where N is an integer greater than one; and a server coupled to the first and second computers on the plurality of parallel, logical connections, the server receiving segments of a file from the first computer on each of the connections, storing the segments in a streaming file for each connection, and streaming the segments to the second computers for each connection.

9. The computing system of claim 8, wherein the first computer establishes the plurality of parallel, logical connections between the first application and the second application, creates a send buffer to store N segments of the file at the first computer, N being an integer greater than one, and stores N segments of the file into the send buffer, and sends each segment in the buffer on a corresponding connection among the plurality of parallel, logical connections for delivery to the second application.

10. The computing system of claim 9, wherein the first system sends each segment on each connection independently of the other connections.

11. The computing system of claim 8, wherein the plurality of parallel, logical connections comprises N connections, wherein the server creates N streaming files for the N connections, appends each segment on the N connections received from the first computer to a corresponding streaming file for the N connections, and streams the segments in the N streaming files to the second computer on the N connections.

12. The computing system of claim 11, wherein the server streams the segments to the second computer on each connection independently of the other connections.

13. The computing system of claim 11, wherein the second computer creates a receive buffer to store N segments of the file at the second computer, stores streamed segments from the server in the receive buffer for each connection, and orders the segments in the receive buffer for delivery to the second application.

14. The computing system of claim 13, wherein the second computer stores streamed segments for each connection independently of the other connections.

15. The computing system of claim 8, wherein the plurality of parallel, logical connections comprises a plurality of parallel transfer control protocol (TOP) connections.

16. A client computer comprising:

a buffer to store N segments of a data file, N being an integer greater than one; and a first application to establish a plurality of parallel, logical connections with a second application operating on a remote computer by selecting a number N of unused port numbers on the first computer and to transmit each of the N segments on a corresponding connection among the plurality of parallel, logical connections for delivery to the second application.

17. The client computer of claim 16, wherein the first application transmits each segment on each connection independently of the other connections.

18. The client computer of claim 17, wherein the buffer stores streamed segments for each connection from a server.

19. The client computer of claim 18, wherein the first application reorders the streamed segments for a data file.

20. The client computer of claim 18, wherein the buffer stores the streamed segments for each connection independently of the other connections.

21. The client computer of claim 16, wherein the plurality of parallel, logical connections include a plurality of parallel transfer control protocol (TCP) connections.

22. A server comprising:

a plurality of N buffers to store N segments of a data file received from N parallel, logical connections, N being an integer greater than one, and each connection being established to transfer packets from a first application on a first computer to a second application on a second computer wherein each connection uses a port number selected from a number N of unused port numbers on the first computer, where N is an integer greater than one; and a file management module to manage the N buffers and to stream out the N segments received from the first application to the second application on the N parallel, logical connections.

23. The server of claim 22, the buffer stores segments one each connection independently of the other connections.

24. The server of claim 22, wherein the file management module creates N streaming files for the N connections, appends each segment on the N connections received from the first application to a corresponding streaming file for the N connections, and streams the segments in the N streaming files to the second application on the N connections.

25. The server of claim 22, wherein the file management module streams the segments on each connection independently of the other connections.

26. The server of claim 22, wherein the plurality of parallel, logical connections include a plurality of parallel transfer control protocol (TCP) connections.

* * * * *